United States Patent [19]
Masson

[11] Patent Number: 5,819,528
[45] Date of Patent: Oct. 13, 1998

[54] TURBOJET ENGINE THRUST REVERSER HAVING DUAL PIVOTING DOORS

[75] Inventor: Bertrand H. E. F. P. Masson, Le Havre, France

[73] Assignee: Societe Hispano Suiza, Columbes Cedex, France

[21] Appl. No.: 740,556

[22] Filed: Oct. 30, 1996

[30] Foreign Application Priority Data

Nov. 2, 1995 [FR] France .................................. 95 12887

[51] Int. Cl.⁶ ..................................................... F02K 3/02
[52] U.S. Cl. ..................... 60/226.2; 60/230; 239/265.33; 239/265.37; 244/110 B
[58] Field of Search ................................. 60/226.2, 230; 244/110 B; 239/265.33, 265.37

[56] References Cited

U.S. PATENT DOCUMENTS

| | | |
|---|---|---|
| 3,279,182 | 10/1966 | Helmintoller . |
| 3,601,992 | 8/1971 | Maison ...................................... 60/230 |
| 3,605,411 | 9/1971 | Maison et al. . |
| 3,614,037 | 10/1971 | Vdolek ............................... 244/110 B |
| 3,739,582 | 6/1973 | Maison . |
| 4,858,430 | 8/1989 | Belbouche . |
| 4,894,985 | 1/1990 | Dubois . |
| 4,914,905 | 4/1990 | Dubois et al. . |
| 4,916,895 | 4/1990 | Dubois . |
| 4,960,243 | 10/1990 | Dubois et al. . |
| 4,976,466 | 12/1990 | Vauchel . |
| 5,039,171 | 8/1991 | Lore . |

FOREIGN PATENT DOCUMENTS

| | | |
|---|---|---|
| 1482538 | 5/1967 | France . |
| 2030034 | 10/1970 | France . |
| 2146109 | 3/1973 | France . |
| 2618852 | 2/1989 | France . |
| 2618853 | 2/1989 | France . |
| 2621082 | 3/1989 | France . |
| 2627807 | 9/1989 | France . |
| 2634251 | 1/1990 | France . |
| 2638207 | 4/1990 | France . |
| 2651021 | 2/1991 | France . |
| 6-241203 | 8/1994 | Japan . |
| 6-241205 | 8/1994 | Japan . |
| 1177864 | 1/1970 | United Kingdom . |
| 1605235 | 6/1985 | United Kingdom . |

*Primary Examiner*—Charles G. Freay
*Attorney, Agent, or Firm*—Bacon & Thomas

[57] ABSTRACT

A thrust reverser for a turbojet engine is disclosed having a first thrust reverser door pivotally attached to the engine cowling so as to be movable between a forward thrust position and a reverse thrust position, the first thrust reverser door having a first inner surface forming a portion of the outer boundary of the gas flow duct when the first thrust reverser door is in the forward thrust position, a first outer surface and a rear portion which extends into the gas flow duct when the first thrust reverser door is in the reverse thrust position so as to direct at least a portion of the gases passing through the duct outwardly through an opening in the cowling, and a second thrust reverser door pivotally connected to the cowling so as to also be movable between a forward thrust position and a reverse thrust position, the second thrust reverser door having a second outer surface which, with the first inner surface of the first thrust reverser door, form opposite boundaries of a passage directing the gases in a reverse thrust direction when the first and second thrust reverser doors are in their reverse thrust positions, and a second inner surface to direct air flowing over the outer cowling surface away from the reverse thrust gas flow.

13 Claims, 7 Drawing Sheets

(PRIOR ART)

TURBOJET ENGINE THRUST REVERSER HAVING DUAL PIVOTING DOORS

BACKGROUND OF THE INVENTION

The present invention relates to a thrust reverser for a turbojet engine, more particularly such a thrust reverser having dual pivoting thrust reverser doors to form a passage for the reverse thrust gasses.

Turbofan-type turbojet engines comprise a primary exhaust flow duct extending coaxially with the longitudinal axis of the engine for exhausting the hot gases after passing through the turbine stages, and a secondary annular flow duct extending around the primary exhaust flow duct to serve as an outer boundary of a duct for the flow generated by the turbofan. In such engines having a relatively high bypass ratio, a thrust reversing system may be applied solely to the air flow passing through the secondary annular duct. The deflection of these gases in a direction having a forward thrust component will provide a sufficient thrust reversing effect.

Thrust reversing devices are also well-known in the art and may comprise one or more thrust reversing doors pivotally attached to the annular fan cowling forming the boundary of the secondary air flow duct. The thrust reverser doors are movable between forward thrust positions and reverse thrust positions. In the forward thrust positions, the outer surfaces of the doors are substantially flush with the outer surface of the fan cowling and the air passing through the annular duct is unimpeded by the doors. In the reverse thrust positions, the doors pivot about axes extending generally transversely to the longitudinal axis of the engine such that upstream edges of the doors are moved radially outwardly, while downstream edges are moved radially inwardly such that all, or a significant portion, of the air passing through the secondary duct is deflected through laterally facing openings in the fan cowling. The air directed through these openings has a forward acting component to supply the requisite reverse thrust.

Figure 1:
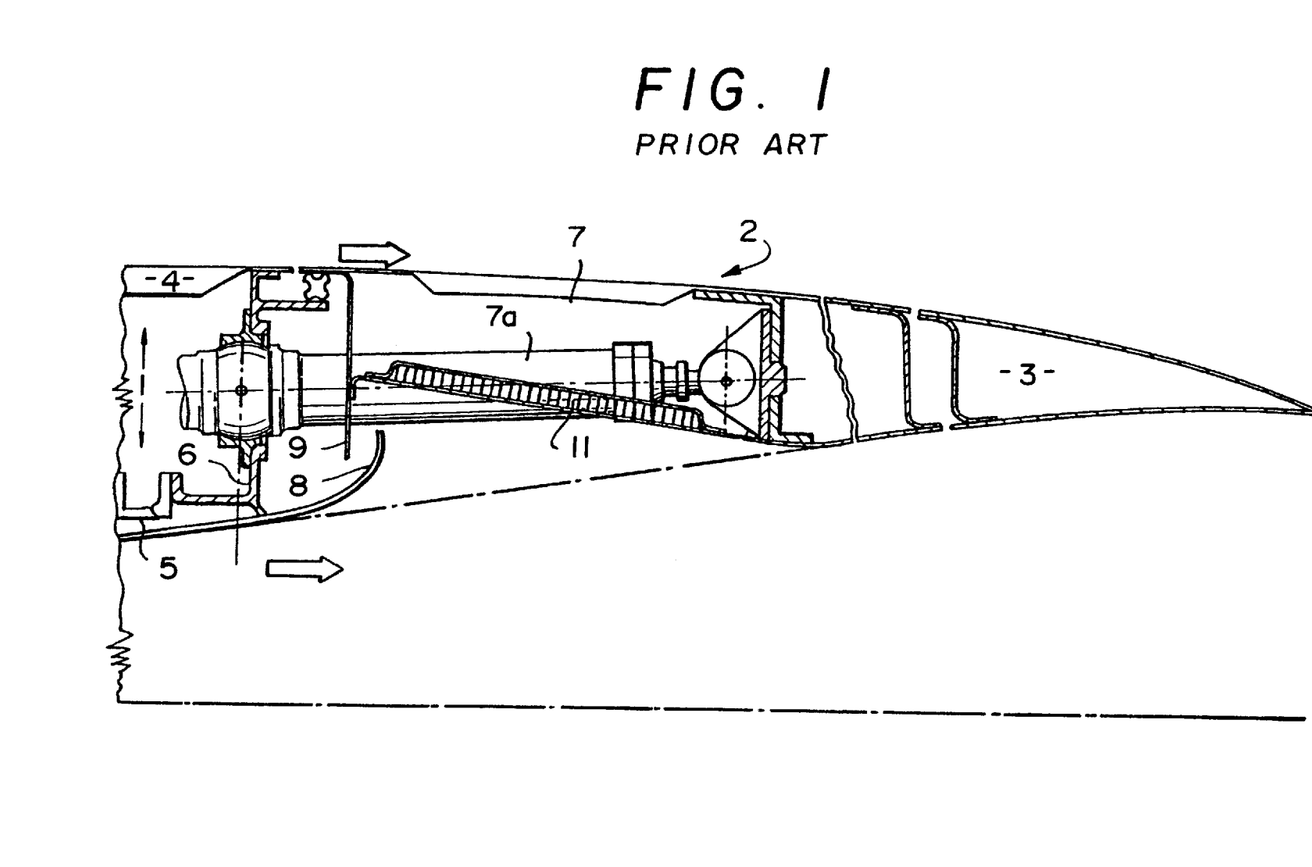
FIG. 1 is a partial, cross-sectional view illustrating a known type of pivoting door thrust reverser.
Figure 2:
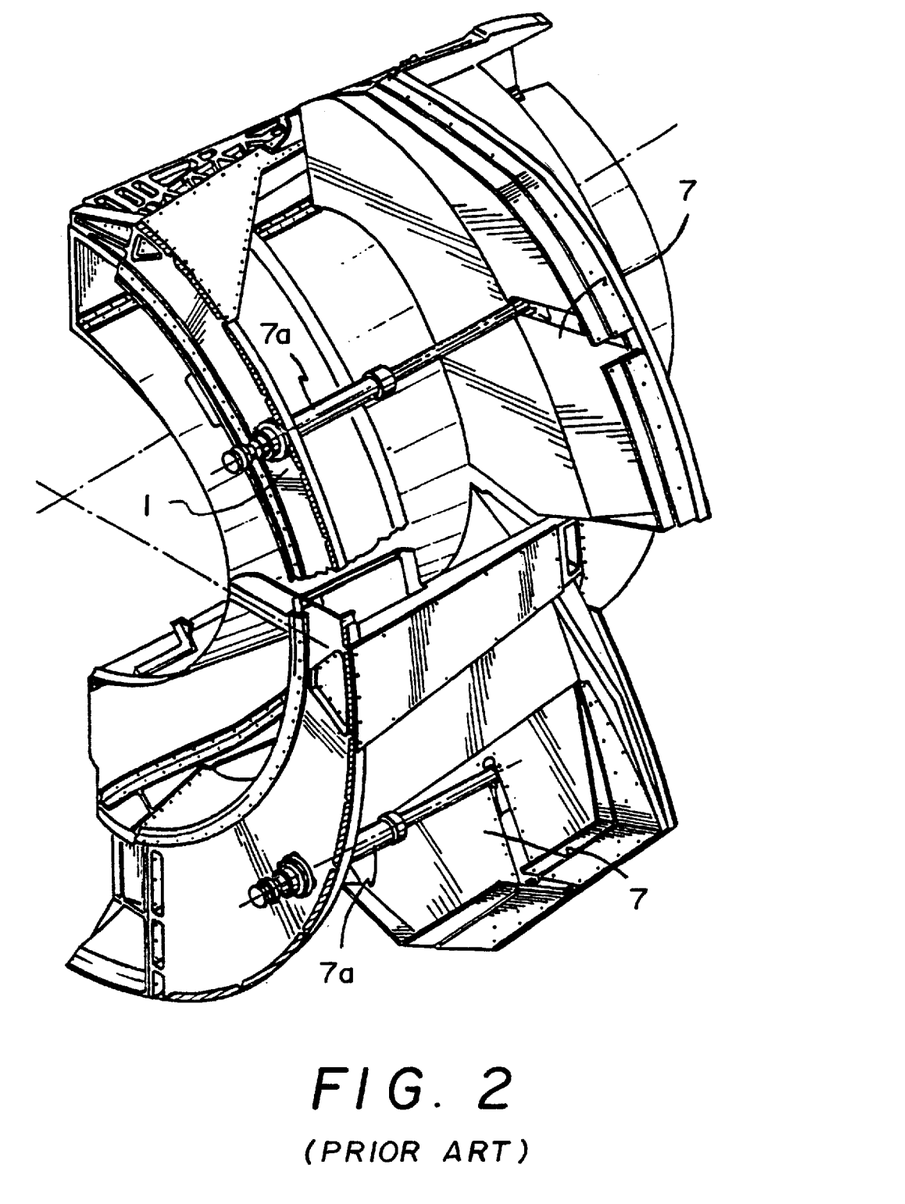
FIG. 2 is a partial, perspective view of a cowling incorporating the known thrust reverser doors of FIG. 1.

Typical, known pivoting door thrust reversers are illustrated in French Patents 1 482 538 and 2 030 034, and U.S. Pat. No. 3,605,411. FIGS. 1 and 2 illustrate typical examples of such known pivoting door thrust reversers. The annular cowling bounding the fan air flow duct has a fixed stationary upstream portion 1, a thrust reversing system 2 and a downstream cowling portion 3. The fixed upstream cowling portion 1 comprises an outer panel 4 which defines an outer air flow surface of the cowling, an inner panel 5 which forms in the outer boundary of the annular air flow duct and a structure 6 which interconnects the outer and inner panels 4 and 5, respectively. The structure 6 also provides a mounting point for the actuator 7a, which typically comprises a cylinder having an extendable and retractable piston rod connected to a pivoting thrust reverser door 7. Door 7 is pivotally attached to the annular cowling such that, as the piston rod of the actuator 7a is extended, the upstream edge of the door 7 (towards the left as viewed in FIG. 1) moves outwardly from the cowling, while the downstream edge of the door moves radially inwardly into the air flow duct so as to uncover a laterally facing thrust reverser opening in the annular cowling. The door shown in its forward thrust in FIG. 1 and in the reverse thrust position in FIG. 2. The inner panel 5 may have a deflector edge 8 so as to facilitate the flow of the gases in the reverse thrust direction with minimal disturbance and a deflector 9 extending from the forward inner surface 11 of the door 7 which imparts a forward direction to the gases passing through thrust reverse opening to increase the efficiency of the thrust reverser door.

Depending upon the specific application of the turbofan engine, any number of such thrust reverser doors and openings may be utilized.

The thrust reverser opening in the cowling must be of an adequate size to allow the deflected gases to flow therethrough without degrading the engine operation. Other known pivoting door type thrust reversers are illustrated in French Patents 2 618 853; 2 618 852; 2 621 082; 2 627 807; 2 634 251; 2 638 207; and 2 651 021.

Whiles these thrust reverers have generally proven to be successful, they are not without certain drawbacks. If the turbofan engine is mounted on the exterior of an aircraft moving through the air, the air passing over the outer surface of the turbofan cowling acts against the thrust reverser gases passing laterally through the opening in the cowling thereby lowering the thrust reverser efficiency by:

reducing the effective cross-section of the opening by turbulence or swirl at the edge of the opening;

modifying the resultant vector of the thrust reverser gases;

producing instabilities in the exhaust speeds of the gases and possibly inducing engine surges due to the downstream pressure variations;

making it difficult to adequately control the direction of the reverse gas flow entailing the possibility of it impacting on the aircraft structure or being subject to re-ingestion into the engine intake; and, inducing large mechanical stresses in the thrust reverser doors and causing the doors to be consequently reinforced, thereby increasing their weight.

SUMMARY OF THE INVENTION

A thrust reverser for a turbojet engine is disclosed having a first thrust reverser door pivotally attached to the engine cowling so as to be movable between a forward thrust position and a reverse thrust position, the first thrust reverser door having a first inner surface forming a portion of the outer boundary of the gas flow duct when the first thrust reverser door is in the forward thrust position, a first outer surface and a rear portion which extends into the gas flow duct when the first thrust reverser door is in the reverse thrust position so as to direct at least a portion of the gases passing through the duct outwardly through an opening in the cowling, and a second thrust reverser door pivotally connected to the cowling so as to also be movable between a forward thrust position and a reverse thrust position, the second thrust reverser door having a second outer surface which, with the first inner surface of the first thrust reverser door, form opposite boundaries of a passage directing the gases in a reverse thrust direction when the first and second thrust reverser doors are in their reverse thrust positions, and a second inner surface to direct air flowing over the outer cowling surface away from the reverse thrust gas flow.

The first and second thrust reverser doors are both located adjacent a single thrust reverser opening formed in the annular cowling with the second thrust reverser door located adjacent to an upstream edge of the opening. In the reverse thrust position, the second thrust reverser door forms a baffle projecting into the airstream passing over the outer surface of the cowling so as to deflect this airstream away from the thrust reverser gases passing through the opening so as to maximize the efficiency of the thrust reversing gases.

Guide vanes or grooves may be formed on the outer surface of the second thrust reverser door so as to further impart a specific direction to the thrust reverser gases passing between the first and second thrust reverser doors.

Both the first and second thrust reverser doors extend outwardly from the cowling when in their reverse thrust positions to provide a reverse thrust gas passageway extending outwardly beyond the outer surface of the cowling.

DETAILED DESCRIPTION OF THE PREFERRED EMBODIMENTS

Figure 3:
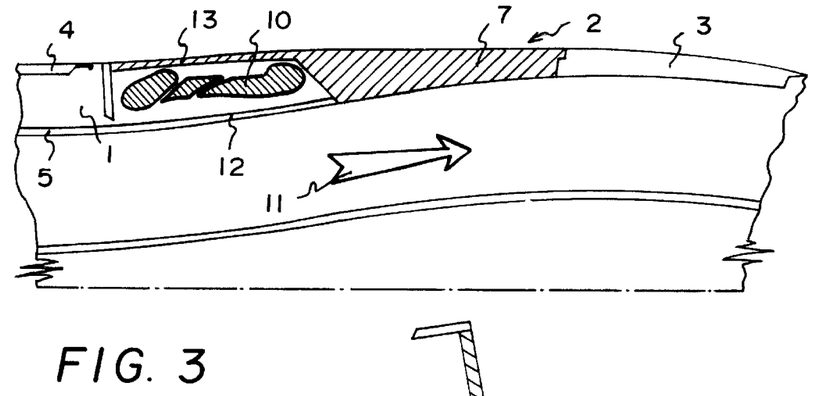
FIG. 3 is a partial, cross-sectional view of an engine cowling incorporating a first embodiment of the thrust reverser according to the present invention illustrating the thrust reverser doors in their forward thrust positions.
Figure 4:
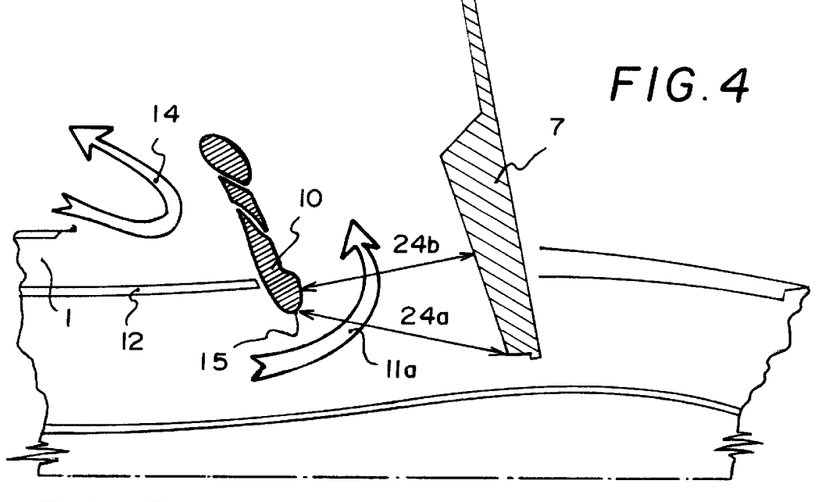
FIG. 4 is a partial, cross-section view similar to FIG. 3, but illustrating the thrust reverser doors in their reverse thrust positions.

In the descriptions and illustrations of the embodiments of the present invention, those portions of the aircraft cowling and pivoting thrust reverser doors similar to the previously described prior art devices have been given the same identifying numerals. As can be seen in FIG. 3, the thrust reverser according to the present invention is utilized with an aircraft cowling 1 having an outer panel 4, an inner panel 5, a pivoting thrust reverser door 7 and a downstream cowling portion 3. In the present invention, the main thrust reverser door 7 is combined with a secondary thrust reverser door 10 as illustrated in a first embodiment in FIGS. 3–9. In this embodiment, the inner panel 5 of the cowling 1 has an extension 12 which is substantially flush with the inner panel 5 and which forms a part of the outer boundary of the annular gas flow duct. As can be seen, an inner surface of the thrust reverser door 7 also forms a portion of the outer boundary of the gas flow duct through which the gases flow in a direction of arrow 11. A sealing system, similar in design to that disclosed in French Patent 2 651 021, may be used to insure sealing between the main door 7 and the secondary door 10 when these elements are in their forward thrust positions. As best seen in FIG. 4, when the main thrust reverser door 7 is deployed to the reverse thrust position, a rear portion of the door extends into the gas flow duct so as to redirect the gases in the direction of arrow 11a. The force exerted on the main door 7 by the gases within the gas flow duct bias the main thrust reverser door 7 toward the forward thrust position so as to preclude any undesired deployment of the door to the reverse thrust position.

As in the known system discussed previously, an actuator (not shown) may be associated with the main thrust reverser door 7 to move the door between the forward and reverse thrust positions. Known means are also utilized to move the secondary thrust reverser door 10 between its forward thrust position, illustrated in FIG. 3, and its reverse thrust position, illustrated in FIG. 4. Such known means may comprise a mechanical linkage interconnecting the secondary door 10 with the actuator for the main thrust reverser door 7, or may comprise an independent actuator connected to the secondary thrust reverser door 10 such that this element may be driven independently of the main thrust reverser door 7.

When in the reverse thrust position, the secondary thrust reverser door 10 bears against the downstream (towards the right as viewed in FIG. 4) portion of extension 12 to prevent leakage of the gas flow between these elements. Again, known sealing means may be utilized to achieve this objective.

The combination of the main thrust reverser door 7 and the secondary thrust reverser door 10 in their extended positions form opposite boundaries of a flow passage directing the reverse thrust flow of the gases. Since both doors 7 and 10 extend radially outwardly beyond the outer surface 4 of the cowling, the passage also extends radially outwardly of the cowling and can be utilized to provide a more definitive direction to the reverse thrust gas flow. The inlet to this flow passage is schematically illustrated at 24a with the narrowest portion of the passage illustrated at 24b.

The air flowing over the outer surface of the outer panel 4 of the cowling is prevented from disrupting the reverse thrust gas flow by the secondary thrust reverser door 10. When this door 10 is in its reverse thrust position, it acts as a baffle against the external airflow so as to redirect this air flow, illustrated by arrow 14, away from the reverse thrust gas flow. This prevents disturbance of the reverse thrust gas flow by air flowing over the exterior of the cowling. It is also enables a more stable speed profile to be achieved at the exit of the passage 24 because the reverse thrust gas flow is not mixed with the external air flow. The barrier set up by the secondary door 10 also reduces the deflection of the reverse thrust gas flow 11a by the external air flow 14 and reduces the stress imposed on the main thrust reverser door 7, since this main door 7 is no longer directly impacted by the external air flow.

Figure 5:
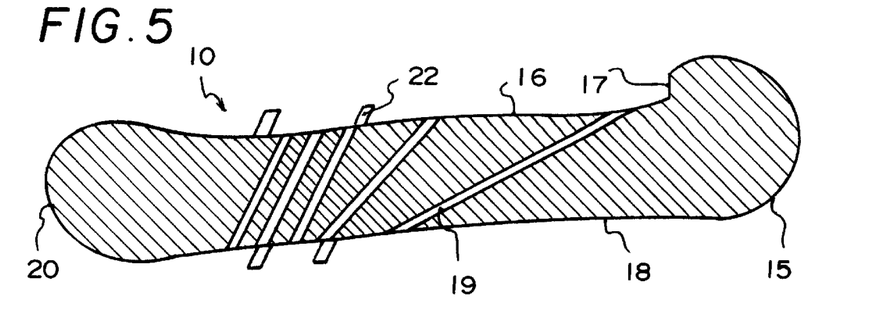
FIG. 5 is a cross-sectional view of the second thrust reverser door illustrated in FIGS. 3 and 4.
Figure 7:
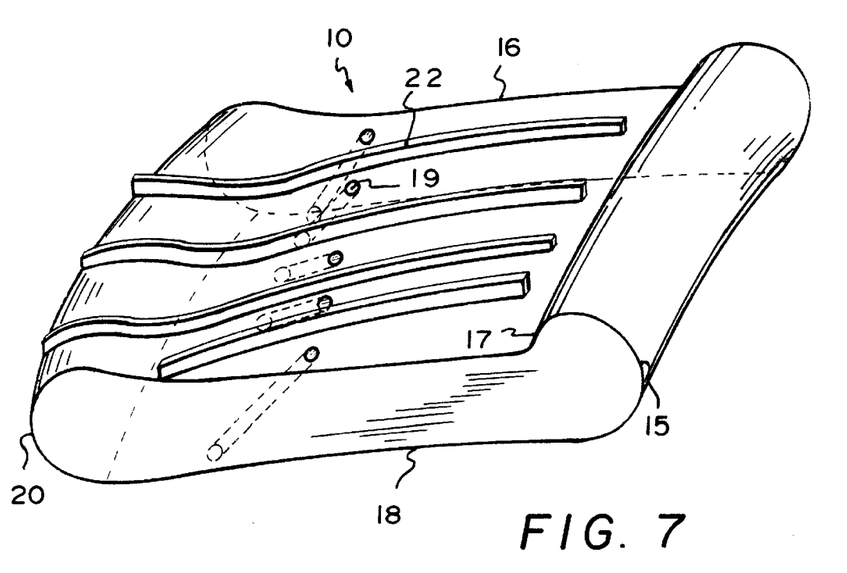
FIG. 7 is a perspective view of the thrust reverser door illustrated in FIGS. 5 and 6.

In this embodiment, the secondary thrust reverser door 10 is enclosed by the inner panel extension 12 and a forward portion 13 of the main thrust reverser door 7 when in the forward thrust position. Since the secondary thrust reverser door 10 is shielded from both the gas flow through the annular duct and the external air flow when in the forward thrust position, its inner and outer surfaces may be optimized for deflecting the external air flow and for guiding the reverse thrust gas flow when in the reverse thrust position. Thus, the rear or downstream edge 15 of the secondary thrust reverser door 10 may comprise a convexly curved surface to minimize the flow separation of the gases when in the reverse thrust position. As illustrated in FIGS. 5 and 7, a step 17 interconnects the convexly curved edge surface 15 with an upper flow surface 16 to generate a local vacuum which prevents premature detachment of the reverse thrust gases passing over this surface. Slits or openings 19 may be provided through the thrust reverser door 10 between the upper surface 16 and the lower surface 18 oriented at an appropriate angle and located such that strong reattachment of the reverse thrust gas flow to the door takes place for the purpose of increasing the reverse thrust passage. The slits or openings 19 are located after the stopping point of the external air flow 14 against the inner surface 18 preventing any flow in the opposite direction. In this manner, the external air flow, after having impacted against the secondary thrust reverser door 10, urges the reverse thrust gas flow in the reverse thrust passage against the outer surface 16 of the secondary door 10.

The forward end 20 of the secondary thrust reverser door 10 may also be contoured in a convexly curved fashion to form an optimized deflection edge in order to direct the reverse thrust gas flow in a direction so as to generate maximum reverse thrust, while at the same time, assuring appropriate gas flow output.

Figure 6:
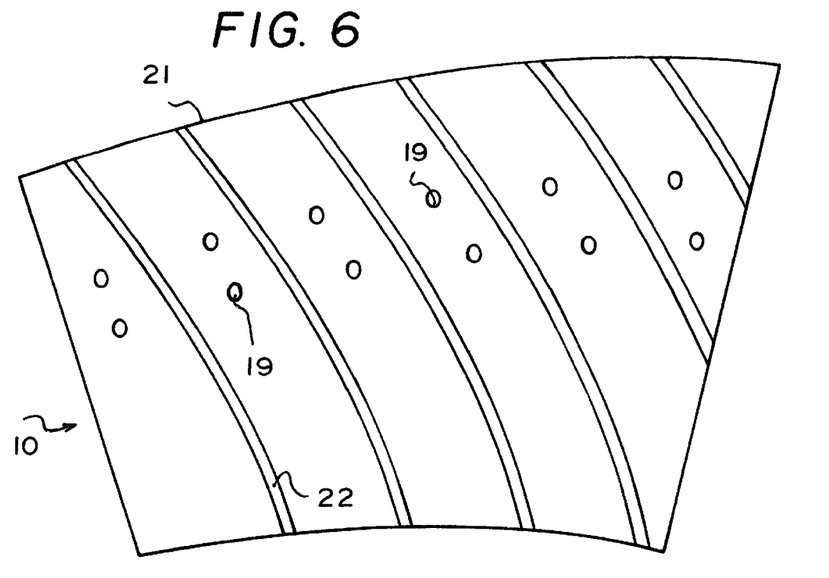
FIG. 6 is a top plan view of the thrust reverser door illustrated in FIG. 5.

As illustrated in FIG. 6, the forward edge 21 of the secondary thrust reverser door 10 may also be formed as a curve, or may be otherwise shaped so as to provide a desired direction to the reverse thrust gases passing through the passageway, when utilized in conjunction with the main thrust reverser door 7. The reverse thrust gases may be given a specific direction to preclude re-ingestion of the gases into the jet engine, or to avoid contact with the aircraft structure.

Additional direction may be provided by guide grooves or guide vanes 22 formed in, or extending from, the outer surface 16 of the secondary thrust reverser door 10. Such guide grooves or guide vanes may also be formed on the inner surface 18 in order to impart a desired direction to the redirected external air flow 14.

As illustrated in FIG. 4, the rear portion of the secondary thrust reverser door 10 may extend partially into the gas flow passage when in the reverse thrust direction to provide a reduced cross-sectional area portion which is advantageous when the gas flow speed is low, but the rate is high.

Figure 8:
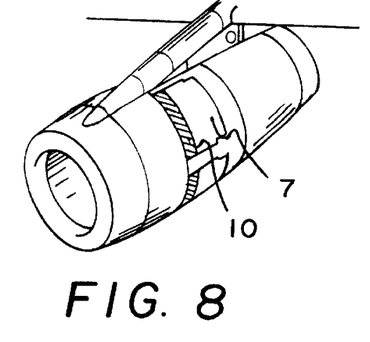
FIG. 8 is a perspective view of an engine cowling with the thrust reverser doors in their forward thrust positions.
Figure 9:
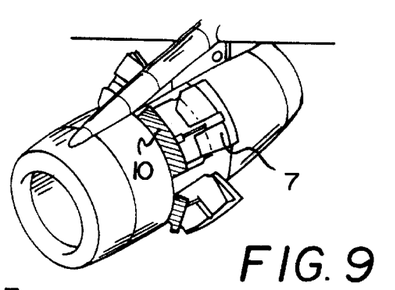
FIG. 9 is a perspective view of an aircraft engine cowling illustrating the thrust reverser doors according to the present invention in their reverse thrust position.

FIGS. 8 and 9 illustrate an engine cowling incorporating the previously described thrust reverser. In FIG. 8, thrust reverser doors 7 and 10 are in their forward thrust positions, also illustrated in FIG. 3, while in FIG. 9, the thrust reverser doors 7 and 10 are in their reverse thrust position, as also illustrated in FIG. 4. In the reverse thrust position, the secondary thrust reverser door 10 also constitutes an air brake which adds to the overall breaking affect of the aircraft during landing.

Figure 10:
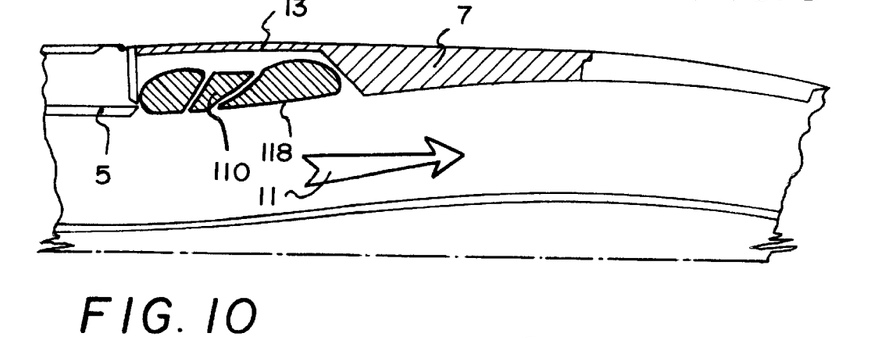
FIG. 10 is a partial, cross-sectional view similar to FIG. 3, illustrating a second embodiment of the thrust reverser according to the present invention with the thrust reverser doors in their forward thrust positions.
Figure 11:
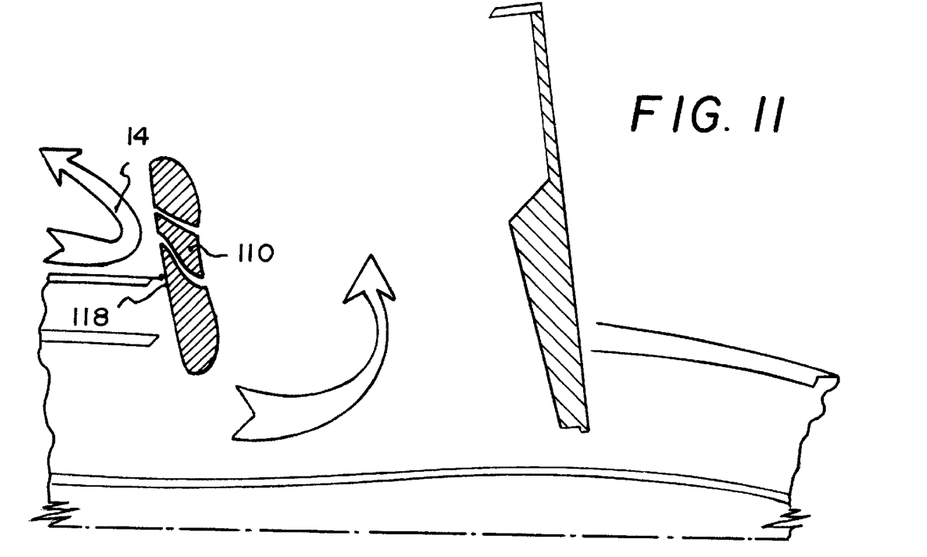
FIG. 11 is a partial, cross-sectional view similar to FIG. 10, but illustrating the thrust reverser doors in their reverse thrust positions.

A second embodiment of the present invention is illustrated in FIGS. 10 and 11. In this embodiment, the downstream extension 12 of the inner panel 5 of the engine cowling is eliminated and the inner surface 118 of secondary thrust reverser door 110 forms a portion of the boundary of the gas flow channel. All other aspects of this embodiment are the same as the embodiment previously described. Since the inner surface 118 forms a portion of the boundary of the gas flow duct 11, its shape is optimized to insure aerodynamic continuity with both the inner wall 5 of the cowling, as well as the inner surface of the primary thrust reverser door 7. The criteria to insure aerodynamic continuity of the gas flow through the duct may require the shape of the surface 118 to be different from the optimum surface shape required during the reverse thrust operation. However, as illustrated in FIG. 11, the secondary thrust reverser door 110 still forms a barrier so as to deflect the external air flow 14 and prevent this flow from degrading the performance of the reverse thrust flow. This embodiment is simpler than that previously described and enables a reduction in weight of the engine cowling, since it eliminates the downstream extension 12. This design of the secondary thrust reverser door 10 also insures the advantages regarding the stability of the main thrust reverser door 7 in the closed position as described in French Patent 2 651 021.

Figure 12:
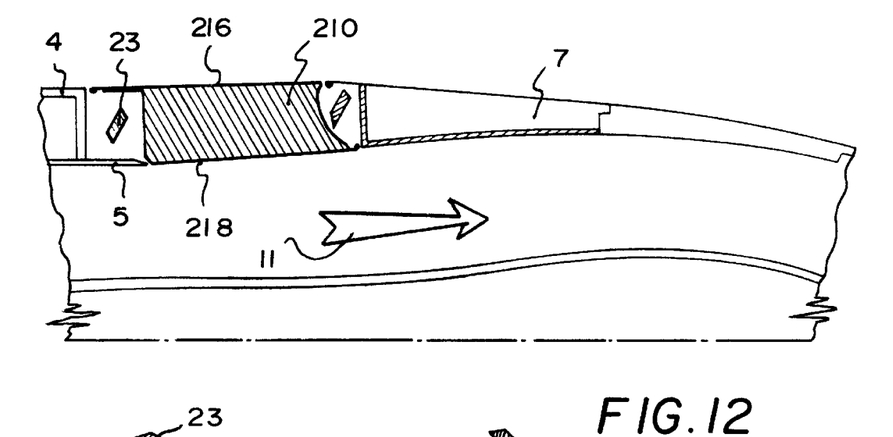
FIG. 12 is a partial, cross-sectional view similar to FIG. 3, but illustrating a third embodiment of the thrust reverser according to the present invention with the thrust reverser doors in their forward thrust positions.
Figure 13:
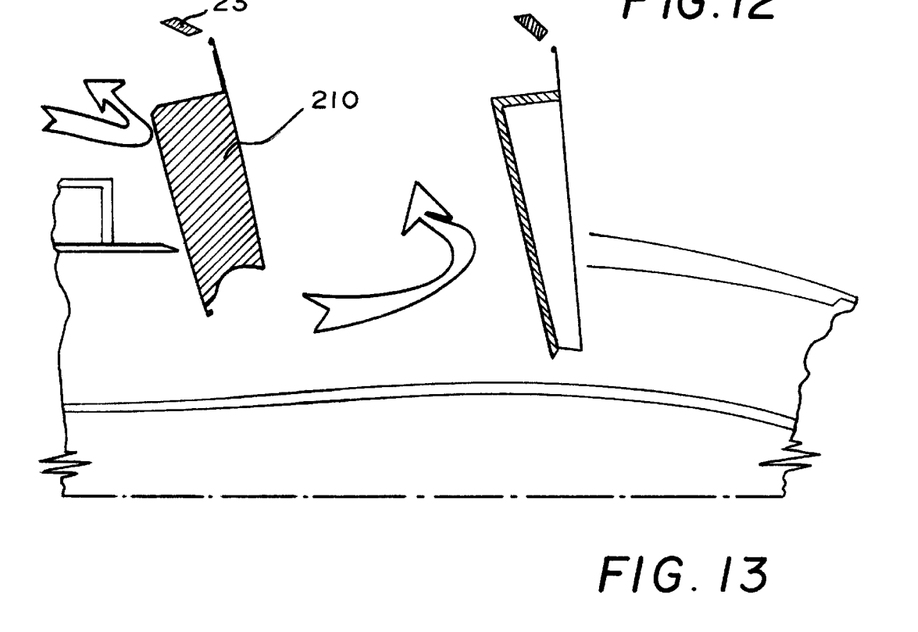
FIG. 13 is a partial, cross-sectional view similar to FIG. 12, but illustrating the thrust reverser doors in their reverse thrust positions.

A third embodiment of the present invention is illustrated in FIGS. 12 and 13. In this embodiment, the forward portion 13 of the main thrust reverser door 7 is eliminated such that the secondary thrust reverser door 210 has both an inner surface 218 which forms a portion of the boundary for the gas flow 11 and an outer surface 216 which is substantially flush with the outer surface of outer panel 4 and the outer surface of the main thrust reverser door 7 when in the forward thrust positions. In this embodiment, this contour of the inner surface 218 is optimized to provide the best aerodynamic flow of the gases passing in through the gas flow duct 11 and the contour of the outer surface 216 is optimized to provide minimal resistance to the air passing over the outer surface of the cowling. Obviously, in this embodiment, the guide grooves or guide vanes 22 may not be utilized. Since the inner and outer surfaces 218 and 216 cannot be optimized for the reverse thrust position, a deflector 23, which may be movable, may extend from the forward edge of the secondary thrust reverser door 210.

Figure 14:
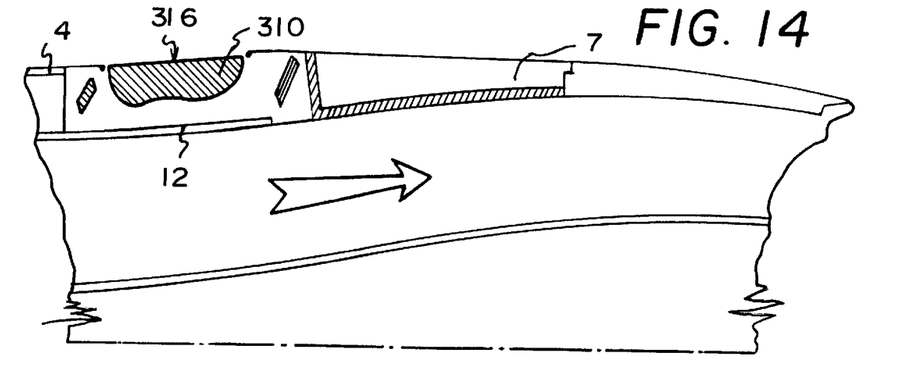
FIG. 14 is a partial, cross-sectional view similar to FIG. 3, illustrating a fourth embodiment of the thrust reverser according to the present invention with the thrust reverser doors in their forward thrust positions.
Figure 15:
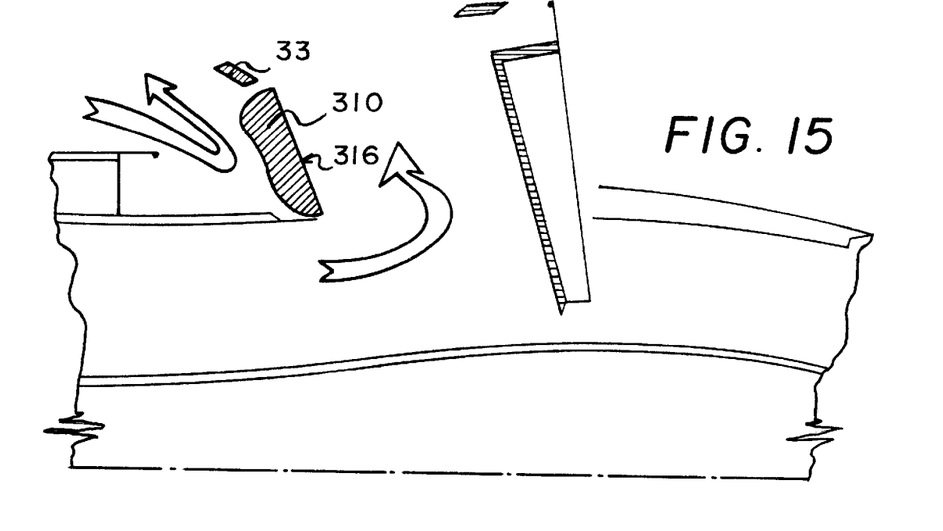
FIG. 15 is a partial, cross-sectional view similar to FIG. 14, but illustrating the thrust reverser doors in their reverse thrust positions.
Figure 16:
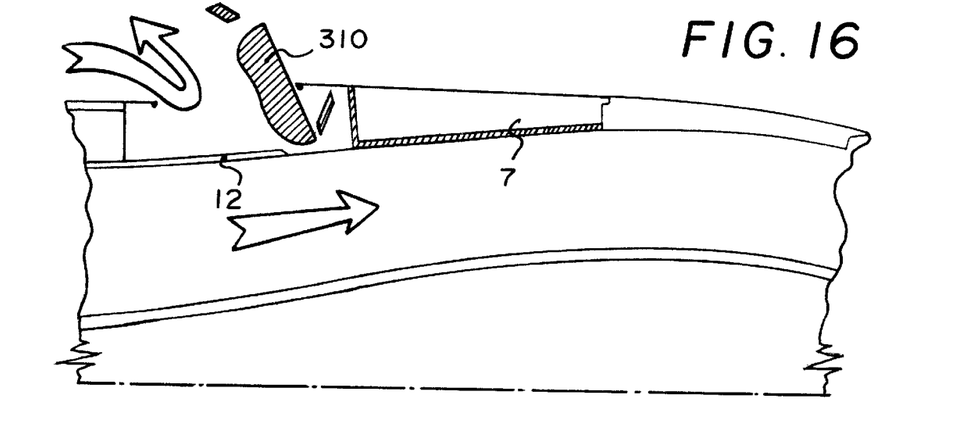
FIG. 16 is a partial, cross-sectional view similar to FIG. 14, illustrating the deployment of the second thrust reverser door to its reverse thrust position.

A fourth embodiment of the present invention is illustrated in FIGS. 14–16. In this embodiment, the downstream extension 12 of the inner panel once again utilized, while outer surface 316 of secondary thrust reverser door 310 is flush with the outer surface of outer panel 4 and the outer surface of thrust reverser door 7 to enable aerodynamic air flow over the cowling. The contour of outer surface 316 is optimized for the aerodynamic air flow when in the forward thrust position. A deflector 33, which may also be movable with respect to the secondary thrust reverser door 310, may extend from the forward edge of the door 310 to increase its effectiveness.

This embodiment offers an additional advantage insofar as the secondary thrust reverser door 310 may be deployed to the reverse thrust position independently from that of the main thrust reverser door 7 as illustrated in FIG. 16. When the main thrust reverser door 7 is in the forward thrust position, it seals against the downstream extension 12 to prevent the air external of the cowling from flowing into the gas flow duct. When moved to the reverse thrust positions, the secondary thrust reverser doors 310 may enhance the roll rate of the aircraft if they are asymmetrically deployed on either side of the aircraft, act as air brake during landing approach and/or descent, and redirect air onto the ailerons or flaps when the aircraft has a high angle of attack.

The thrust reverser according to the present invention may be utilized on all of the thrust reverser openings of a cowling, or may be utilized on less than all of the openings, which may utilize known type thrust reversers. Also, while the described embodiments relate to pivoting door thrust reversers, the secondary thrust reverser doors may be also utilized in conjunction with other types of thrust reversers, such as grille reversers or downstream baffle reversers.

The foregoing description is provided for illustrative purposes only and should be construed as any way limiting this invention, the scope of which is defined solely by the appended claims.

I claim:

1. A thrust reverser for a turbojet engine having a generally annular cowling having an inner cowling surface forming an outer boundary of a gas flow duct and an outer cowling surface, the cowling having at least one reverse thrust opening, the thrust reverser comprising:

a) a first thrust reverser door pivotally attached to the cowling so as to be movable between a forward thrust position and a reverse thrust position, the first thrust reverser door having a first inner surface forming a portion of the outer boundary of the gas flow duct when the first thrust reverser door is in the forward thrust position, a first outer surface and a rear portion which extends into the gas flow duct when the first thrust reverser door is in the reverse thrust position so as to direct at least a portion of gasses passing through the gas flow duct outwardly through the at least one reverse thrust opening; and, b) a second thrust reverser door pivotally connected to the cowling so as to be movable between a forward thrust position and a reverse thrust position, the second thrust reverser door having a second outer surface located such that the second outer surface and the first inner surface form opposite boundaries of a passage directing gasses in a reverse thrust direction when the first and second thrust reverser doors are in their reverse thrust positions, and a second inner surface to direct air flowing over the outer cowling surface away from contact with the reverse thrust gas flow.

2. The thrust reverser of claim 1 wherein the second inner surface also forms a portion of the outer boundary of the gas flow duct when the second thrust reverser is in the forward thrust position.

3. The thrust reverser of claim 1 wherein the second outer surface is substantially flush with the outer cowling surface when the second thrust reverser door is in the forward thrust position.

4. The thrust reverser of claim 1 wherein the second thrust reverser door comprises:

a) a forward edge portion; and, b) a deflector extending from the forward edge portion.

5. The thrust reverser of claim 4 wherein the deflector is movable with respect to the second thrust reverser door.

6. The thrust reverser of claim 1 wherein the first thrust reverser door has a forward portion extending completely over the second thrust reverser door when the first and second thrust reverser doors are in the forward thrust positions.

7. The thrust reverser of claim 1 further comprising an extension of the cowling completely covering the second inner surface when the second thrust reverser door is in the forward thrust position.

8. The thrust reverser of claim 1 wherein the second thrust reverser door comprises a rear edge portion having a convexly curved deflection edge.

9. The thrust reverser of claim 8 further comprising a step connecting the deflection edge to the second outer surface.

10. The thrust reverser of claim 1 wherein the second thrust reverser door comprises a forward edge portion having a convexly curved deflection edge.

11. The thrust reverser of claim 1 further comprising at least one opening extending through the second thrust reverser door between the second inner surface and the second outer surface.

12. The thrust reverser of claim 1 further comprising at least one gas flow guide means located on the second outer surface.

13. The thrust reverser of claim 12 wherein the gas flow guide means comprises at least one guide vane extending from the second outer surface.

* * * * *